(12) United States Patent
Godbaz

(10) Patent No.: US 12,418,640 B1
(45) Date of Patent: Sep. 16, 2025

(54) DEPTH IMAGING SYSTEM WITH DOWNSAMPLED REFLECTED ILLUMINATION

(71) Applicant: Microsoft Technology Licensing, LLC, Redmond, WA (US)

(72) Inventor: John Peter Godbaz, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/645,074

(22) Filed: Apr. 24, 2024

(51) Int. Cl.
| | | |
|---|---|---|
| *H04N 13/30* | (2018.01) | |
| *G01S 17/48* | (2006.01) | |
| *G01S 17/894* | (2020.01) | |
| *H04N 13/25* | (2018.01) | |
| *H04N 13/254* | (2018.01) | |
| *H04N 13/296* | (2018.01) | |
| *H04N 13/00* | (2018.01) | |
| *H04N 13/10* | (2018.01) | |
| *H04N 13/15* | (2018.01) | |

(52) U.S. Cl.
CPC ........... *H04N 13/254* (2018.05); *G01S 17/48* (2013.01); *G01S 17/894* (2020.01); *H04N 13/296* (2018.05); *H04N 2013/0081* (2013.01)

(58) Field of Classification Search
CPC ........ H04N 13/30; H04N 13/25; H04N 13/15; H04N 13/10; H04N 13/305; H04N 13/31; H04N 13/315; H04N 13/254
USPC ..... 348/42, 40, 43, 46, 47, 48, 62, 175, 177
See application file for complete search history.

(56) References Cited

U.S. PATENT DOCUMENTS

| 11,882,263 B2 * | 1/2024 | Park ....................... G01S 7/4865 |
| 2014/0049609 A1 * | 2/2014 | Wilson ................. H04N 13/271 |
| | | 348/46 |

* cited by examiner

*Primary Examiner* — Daquan Zhao
(74) *Attorney, Agent, or Firm* — Alleman Hall & Tuttle LLP

(57) ABSTRACT

A method for operating a depth imaging system is presented. The method comprises illuminating an environment using an optical source configured to output modulated structured light comprising a pattern of dots. Reflected illumination is received at an optical sensor comprising a 2D pixel grid. Received reflected illumination from the 2D pixel grid is downsampled to a plurality of 1D dot trail vectors. For each dot trail vector, a depth is indicated based on a time-of-flight depth measurement and a triangulation factor.

20 Claims, 12 Drawing Sheets

DEPTH IMAGING SYSTEM WITH DOWNSAMPLED REFLECTED ILLUMINATION

BACKGROUND

Depth-imaging systems are becoming more commonly used in a variety of consumer electronic devices. For example, some smartphones include integrated, front-facing depth-imaging systems. Further, some laptops and other personal computers include integrated, user-facing depth-imaging systems. Video game systems may include peripheral depth-imaging systems for gesture recognition. Virtual and augmented reality headsets include integrated, world-facing depth-imaging system for machine vision and may further include user-facing depth-imaging systems. In any of such systems, the reliability of gesture recognition, face recognition, and other input modalities depends upon the fidelity of the underlying depth imaging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a method for operating a depth imaging system. The method comprises illuminating an environment using an optical source configured to output modulated structured light comprising a pattern of dots. Reflected illumination is received at an optical sensor comprising a 2D pixel grid. Received reflected illumination from the 2D pixel grid is downsampled to a plurality of 1D dot trail vectors. For each dot trail vector, a depth is indicated based on a time-of-flight depth measurement and a triangulation factor.

DETAILED DESCRIPTION

Different types of depth camera technology exist. As one example, time-of-flight (TOF) depth cameras can be used to produce range images at different distances. However, TOF depth cameras can suffer from errors due to multipath and other factors. Active triangulation/structured illumination depth cameras can produce range images that do not suffer from multipath and are thus more suitable for applications such as object capture (which requires high accuracy). However, the active triangulation/structured illumination sensor can suffer performance problems if either the pattern or optics change over time.

Figure 1:
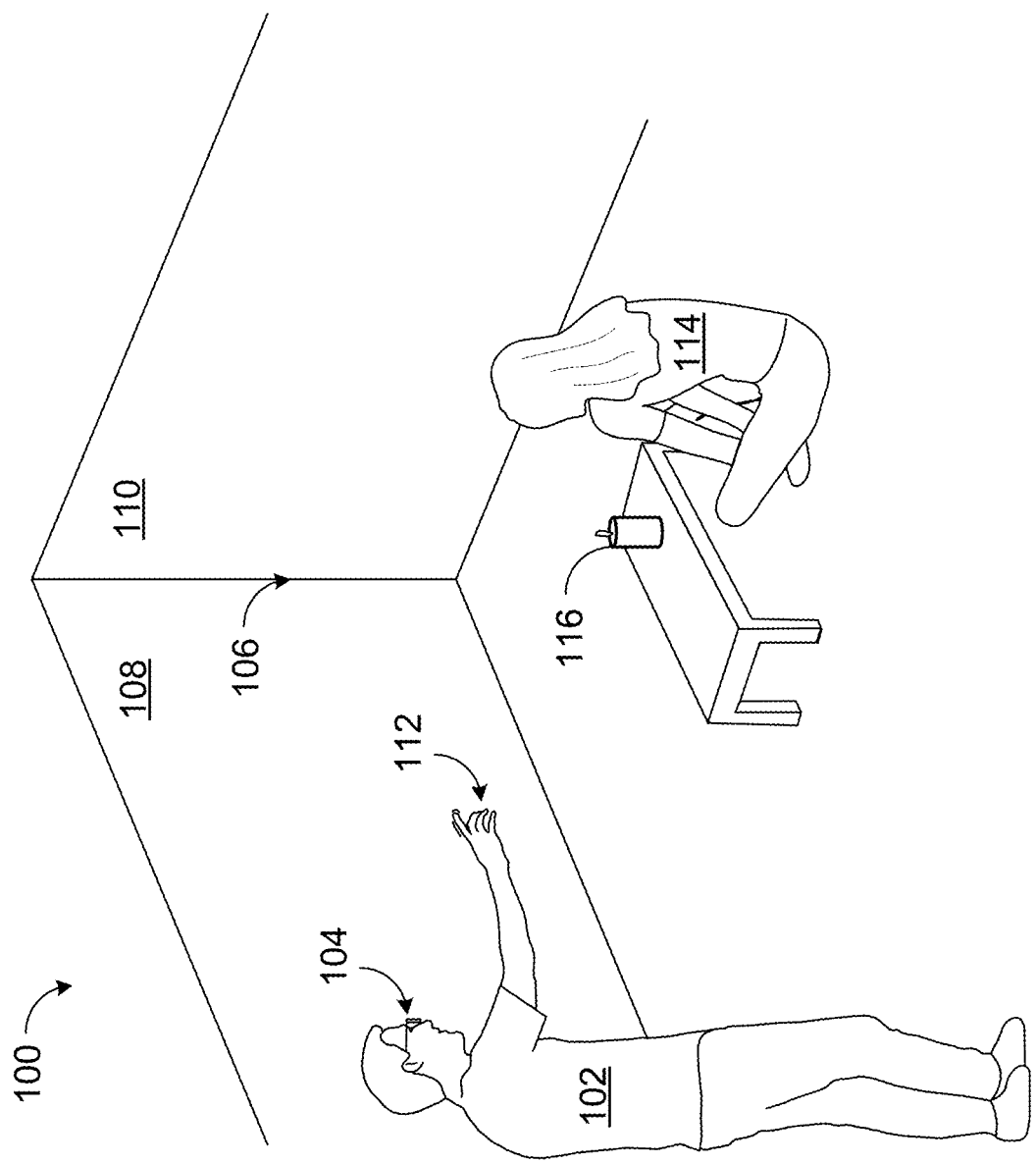
FIG. 1 shows an example environment for operating a depth imaging system.

FIG. 1 shows an example environment 100 for operating a depth imaging system. In this example, user 102 is operating a head-mounted display device 104 comprising a depth imaging system. Multi-path effects are generated when there are multiple depth measurements at the same pixel. This occurs due to light from multiple depths being reflected to the pixel, and makes it difficult to determine a true distance-to-object. This is particularly noticeable in locations such as room corner 106. While wall 108 and wall 110 may provide reliable distance-to-object measurements, high levels of illumination in room corner 106 results in multiple light bounces off of wall 108 and wall 110. The end result is that room corner 106 appears curved in the resulting depth image.

Indirect ToF (iToF) with sparse depth (e.g., powerful dot grid illumination) provides significant improvements in performance under high ambient light (outdoor), for imaging darker objects, etc. iToF cameras utilize a detected phase shift in received light to determine a depth at a pixel. Multiple different illumination frequencies can be used to increase an unambiguous depth sensing range (due to the phase of received light wrapping every 2π radians). A fixed dot pattern is used to sparsely illuminate the environment, thus concentrating the illumination into small sub regions of the image and effectively increasing optical power. Sparse depth solves multipath issues caused by multiple diffuse reflections within a scene by reducing the number of reflections and increasing the signal-to-noise (SNR) relative to the multipath interference. Reflections are generally diffuse at low spatial frequencies. The structured dots are concentrated, so the ratio of true signal to multipath reflections is high. Sparse depth also enables hybrid depth imaging, where triangulation among the sparse-projection features provides an independent depth value suitable to assist phase unwrapping (e.g., disambiguating wrapped phase data using multiple images acquired using different illumination frequencies) or other aspects of ToF imaging.

However, sparse depth does not fully solve problems with subsurface diffusion. When resolving structured light images, it is generally assumed that scene points receive illumination only from the optical source. Objects such as user's hand 112, person 114 and candle 116, through which incident near-infrared (NIR) light from the camera can diffuse and then exit back toward the camera, can yield broken or incorrect range measurements when imaged. Triangulation-based methods, such as those that use structured light, do not suffer from this problem.

Another issue with sparse depth is that the imaging system needs to know where the dots are in the received image. In images with low SNR, depth measurements can be acquired, but more dots may be detected than were emitted, and it is not possible to distinguish where true dots are and where false dots are. True dot locations yield high quality depth measurements, but locations that are not true dots give erroneous depth or systematic errors. One approach to dealing with this is to place the optical source and optical sensor as close together as possible, minimizing the baseline so that the dot location is constant beyond a certain distance. This allows for more simple, fixed calibration without considering triangulation effects. However, this arrangement reduces the applicability of triangulation-based approaches to depth.

Herein, a novel, low compute approach to extracting depth measurements from sparsely illuminated iToF depth images is presented. Both triangulation and ToF data are leveraged to provide higher quality depth images in difficult scenes. In one example, a baseline between an optical source and an optical sensor can be leveraged for improved triangulation imaging. The initial 2D images are downsampled into 1D vectors, which are then searched for dots known to exist. This simplifies and speeds up dot detection and identification algorithms.

Such an approach can achieve detection at low SNR, where dot detection methods generally struggle. In turn, this means that the system can detect depths at further ranges. The approach can provide for increased accuracy over previous approaches and solves subsurface diffusion in a way that sparse iToF sensors that only use ToF depth measurements, and not triangulation, are incapable.

Figure 2:
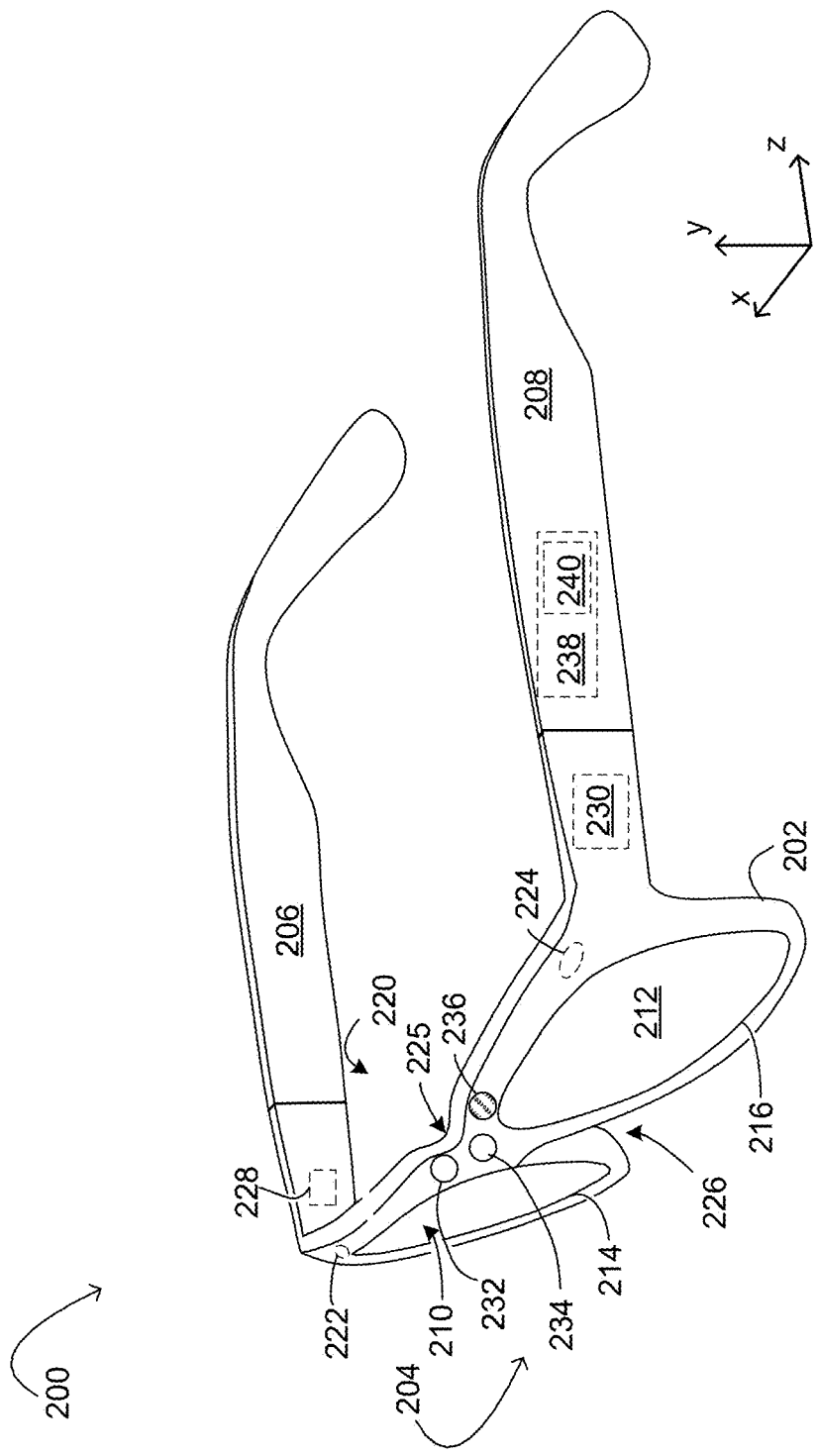
FIG. 2 shows one example of a head-mounted display device including a depth imaging system.

FIG. 2 shows one example of a head-mounted display (HMD) device 200. The HMD device 200 includes a frame 202, a display system 204, and temple pieces 206 and 208. Display system 204 includes a first display 210 and a second display 212 supported by frame 202. Each of first display 210 and second display 212 include optical components configured to deliver a projected image to a respective eye of a user. HMD device 200 may be an example of HMD device 110.

Display system 204 includes a first display module 214 for generating and displaying a first image via first display 210 and a second display module 216 for generating and displaying a second image via the second display 212, where the first image and the second image combine to form a stereo image. In other examples, a single display module generates and displays first images and second images via first display 210 and second display 212, respectively. Each display module may comprise any suitable display technology, such as a scanned beam projector, a microLED (light emitting diode) panel, a microOLED (organic light emitting diode) panel, or an LCoS (liquid crystal on silicon) panel, as examples. Further, various optics, such as waveguides, one or more lenses, prisms, and/or other optical elements may be used to deliver displayed images to a user's eyes.

HMD device 200 further includes an eye-tracking system 220, comprising at least a first eye-tracking camera 222 and a second eye-tracking camera 224. Data from the eye-tracking system 220 may be used to detect user inputs and to help render displayed images in various examples. Eye-tracking system 220 may further include a light source 225. Light emitted by light source 225 may reflect off of a user's eye and be detected by first eye-tracking camera 222 and a second eye-tracking camera 224. In some examples, the light source and the camera of the eye-tracking system are both located on frame 202 HMD device 200.

The position of the user's eye(s) may be determined by eye-tracking system 220 and/or gesture recognition machine 228. For example, eye-tracking system 220 may receive image data from first eye-tracking camera 222 and second eye-tracking camera 224 and may evaluate that data using one or more neural networks or other machine-learning devices.

HMD device 200 further includes an on-board computing system in the form of a controller 230 configured to render the computerized display imagery via first display module 214 and second display module 216. Controller 230 is configured to send appropriate control signals to first display module 214 to form a right-eye image of a stereoscopic pair of images. Likewise, controller 230 is configured to send appropriate control signals to second display module 216 to form a left-eye image of the stereoscopic pair of images. Controller 230 may include a logic subsystem and a storage subsystem, as discussed in more detail below with respect to FIG. 12. Operation of HMD device 200 additionally or alternatively may be controlled by one or more remote computing device(s) (e.g., in communication with HMD device 200 via a local area network and/or wide area network).

HMD device 200 may further include various other components, for example an outward facing two-dimensional image camera 232 (e.g. a visible light camera and/or infrared camera), an outward facing depth imaging device 234, and an outward facing depth illuminating device 236. Outward facing depth imaging device 234 and outward facing depth illumination device 236 are be offset in the X and/or Y dimensions at a baseline distance. While smaller baselines below 10 mm are possible, the advantages of this approach can be enhanced with larger baselines, as this increases the disparity for a given Z. For specialized long range sensors, baselines such as 100 mm can be used in some examples, but are more likely to be challenging in a headset/glasses form-factor. In a headset/glasses form-factor e 10-30 mm baselines can be used in some examples. Additional examples of optical sources and optical sensors are described herein and with regard to FIG. 3.

HMD device 200 may further include a sensor suite 238. Sensor suite 238 may include one or more inertial measurement units (IMUs) 240, which may include one or more accelerometers, gyroscopes, and/or magnetometers. IMUs 240 may be configured to generate positional information for HMD device 200 that allows for determining a 6-degree-of-freedom (6DOF) position of the device in an environment. HMD device 200 may further include a plurality of components that are not shown, including but not limited to speakers, microphones, temperature sensors, touch sensors, biometric sensors, other image sensors, energy-storage components (e.g. battery), a communication facility, a global positioning system (GPS) receiver, etc.

Figure 3:
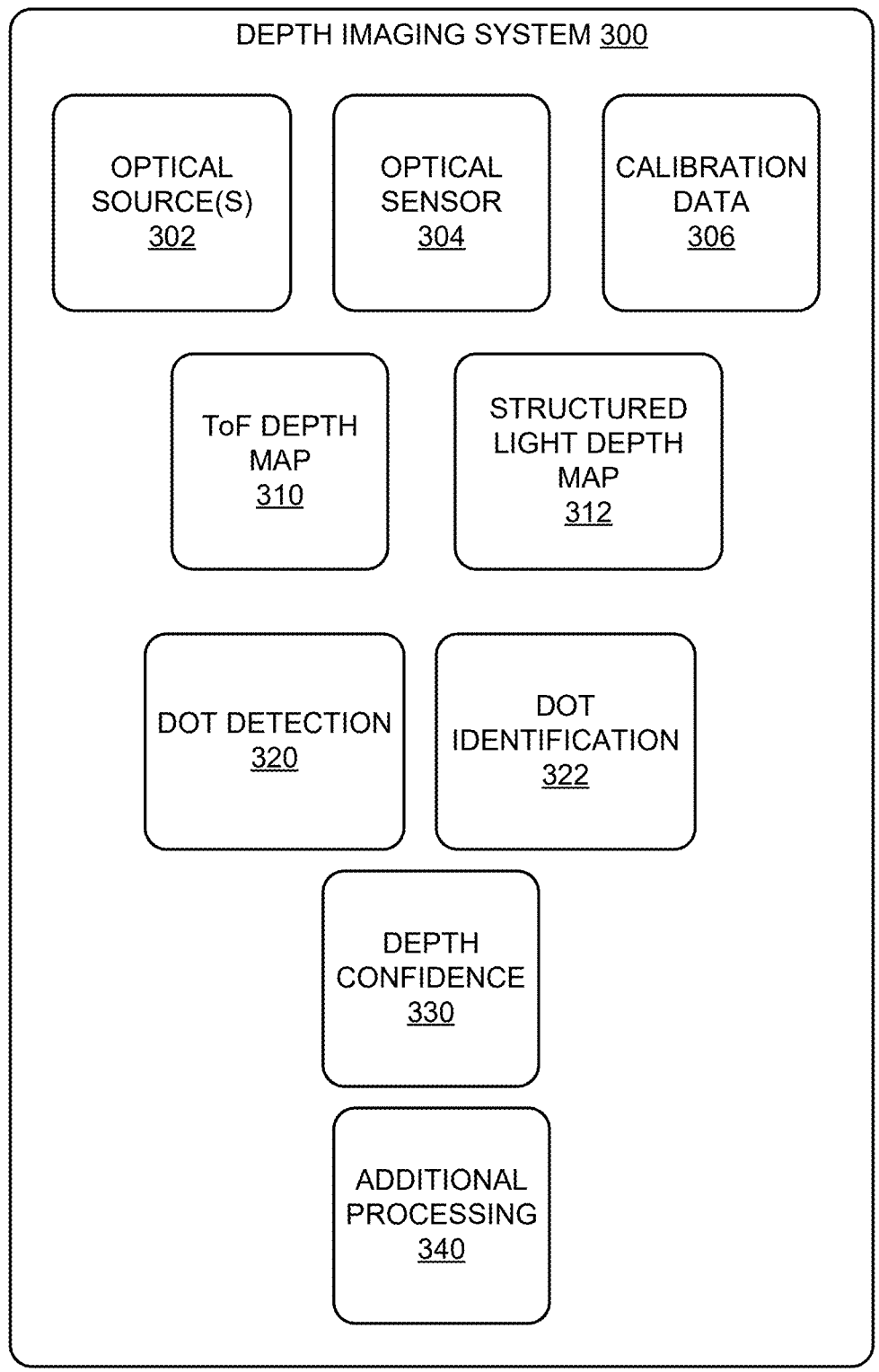
FIG. 3 schematically shows an example depth imaging system.

FIG. 3 schematically represents a block diagram of an example of a depth imaging system 300 suitable for determining a depth map from a structured light image. Depth imaging system 300 includes one or more illumination source(s) 302. For example, optical source(s) 302 may comprise an illumination source configured to output modulated structured light comprising a pattern of dots. Such an optical source may thus project a structured light image onto a scene or environment where the projected light is also modulated. In some examples, the depth imaging system 300 can have a single light source and single imaging system. However, in other examples, optical source(s) 302 includes a separate ToF light source and a separate structured light source. The ToF light source emits modulated light suitable for ToF depth calculations. The structured light source emits structured light that is not modulated. Outward facing depth illuminating device 236 may be an example of optical source(s) 302.

Optical source(s) 302 may comprise a light emitter that outputs structured light that is also modulated light. In such an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output amplitude modulated light at multiple modulation frequencies. The light emitter may be selected so that the wavelength or wavelengths of the emitted light include the most appropriate wavelength(s) for a particular application and/or the characteristics of the environment being imaged. As explained, the modulated light is given a structural arrangement of units that can be organized in a repeating pattern, such as in a grid, or randomized pattern. Herein, the unit is described as a dot, but other shapes may be used.

Optical sensor 304 may comprise a 2D pixel grid. Optical sensor 304 can be used to capture the projected structured light image. The captured structured light image can then be processed by one or more components of FIG. 3 in order to generate a depth map. Optical sensor 304 can include software and hardware to generate a digital image of the captured light.

As described above, using ToF depth measurements in combination with triangulation-based depth measurements may help to disambiguate the effects of subsurface diffusion. In order to generate triangulation-based depth measurements, optical source 302 and optical sensor 304 may be offset at some distance. The spatial relationship between optical source(s) 302 and optical sensor 304 may be included in calibration data 306. In order to detect dots where they cannot be derived directly from the image, a calibration of some sort can be used to provide prior information of where the dots might be. A calibration phase may occur where the depth imaging system is aimed at a flat target, and images taken in depth and active brightness at one or more different distances. This may allow for tracking dots over those different differences, allowing for a model of dot positions to be derived. Calibration data may further be acquired for different temperatures, object reflections, lens distortion, different levels of ambient light, etc.

The components shown in FIG. 3 can be implemented, for example, using a processing unit with associated memory that executes computer-executable instructions. More generally, the components shown in FIG. 1 can be implemented using any suitable combination of hardware, firmware, and/or software. Example computing devices are described herein and with regard to FIG. 12.

For convenience, a plurality of separate components are shown in FIG. 3, but it is understood that combinations of these components can be integrated in some examples. The components can include a TOF-depth map calculation component 310, a structured-light depth-map calculation component 312, a dot detection component 320, a dot identification component 322, and a depth confidence factor component 330. Additionally, FIG. 3 shows an additional processing component 340 for performing additional processing based on a depth map. Additional processing component 340 can, for example, correspond to a texture mapping and rendering component. The output from such an additional processing component 340 could be displayed to a user via a display device (e.g., display system 204). The display device could correspond to a conventional stand-alone video display, an augmented reality headset (e.g., a head-mounted display device), a display screen on a mobile computing device, a display screen associated with another computing device, and/or any other convenient display device.

Dot detection component 320 may analyze the image captured by optical sensor 304 to detect dots within the image. Dot identification component 322 may attempt to identify a correspondence between detected dots in the image with projected dots. In an aspect, each unit in the projected image is assigned a unique identification corresponding to an identified unit in the projected image. The ToF distance for a pixel is used to assign a corresponding identity to each observed dot in the image. While ToF distances are naturally radial, the term z-depth is used herein to refer to the distance to an object projected onto the optical axis of the optical sensor 304. Z-depth can be calculated from ToF radial distance using calibration. Z-depth is inversely proportional to the optical source 302 to optical sensor 304 baseline induced image disparity. While this is true for radial distance, it requires an additional spatially variant correction factor. Because of the simpler relationship between z-depth and disparity, z-depth is used to described the problem, although expressions using radial distance are also possible.

TOF-depth map calculation component 310 uses the frequency of the received light to calculate a TOF z-depth for each unit (e.g., dot) identified by the dot identification component 322.

Structured-light depth-map calculation component 312 uses the distance between the emitted light and a dot to determine the depth of an object in the scene using triangulation, as explained in more detail elsewhere.

Depth-confidence-factor component 330 determines a confidence factor for a dot or image. The confidence factor can be computed using the TOF z-depth for a dot and the structured light z-depth for the dot. Another implementation could be the difference between the two estimates. The confidence factor for individual dots could be combined to form a confidence factor for the image.

With sparse illumination, a fundamental problem is trying to simultaneously solve for depth and dot location. If either is known, the other can be solved for. But without prior information, solving for both is a complicated optimization problem that involves locating dots in two dimensions. When performing dot detection with no prior information, dots must be detected in 2D from a full image (e.g., 512×512 pixels or 262,144 pixels). Many approaches require 2D convolutions, which tend to be high in computing resources. Detected dots have uncertainty in both the X and Y dimensions. False dot detection can result in additional erroneous dots.

With a threshold baseline between the optical source and the optical sensor, the depth imaging system can be calibrated to limit the possibilities for each dot location. Effectively, each dot of the dot pattern can be mapped to a pixel or small subset of pixels for each potential depth given an ideal dot pattern, lens distortion factors, etc. Based on that calibration, it can be determined where a particular dot will be for a particular distance. Effectively, the range of possibilities for each dot can be limited to a finite path or dot trail. This constrains the problem to a 1D detection problem—along the dot trail—rather than a 2D detection problem. By resampling the measurements along that dot trail, either implicitly or explicitly, 1D algorithms can be used to detect the dot. These resampled measurements can be represented as a vector of samples along the trail. The term dot trail vector is used to refer to these samples along the line and is not restricted to the case where the samples are in a line in pixel space. When referring to resampling measurements and forming a 1D dot trail vector, this may in-fact be implemented as a sequential processing of the 1D data in the dot trail where only a single value from the dot trail vector is explicitly held in memory at any time. In such examples, an intermediate value, such as a consistency error score and best depth value so far, is held in memory for one or more dots. This can be referred to as implicit resampling to a 1D vector. When implemented in such a fashion, the memory requirements are substantially reduced. Explicit resampling where a complete 1D dot trail vector is held in memory for one or more dots provides a clean and conceptually simple implementation. However, other implementations may be more suitable for a resource constrained system.

Figure 4:
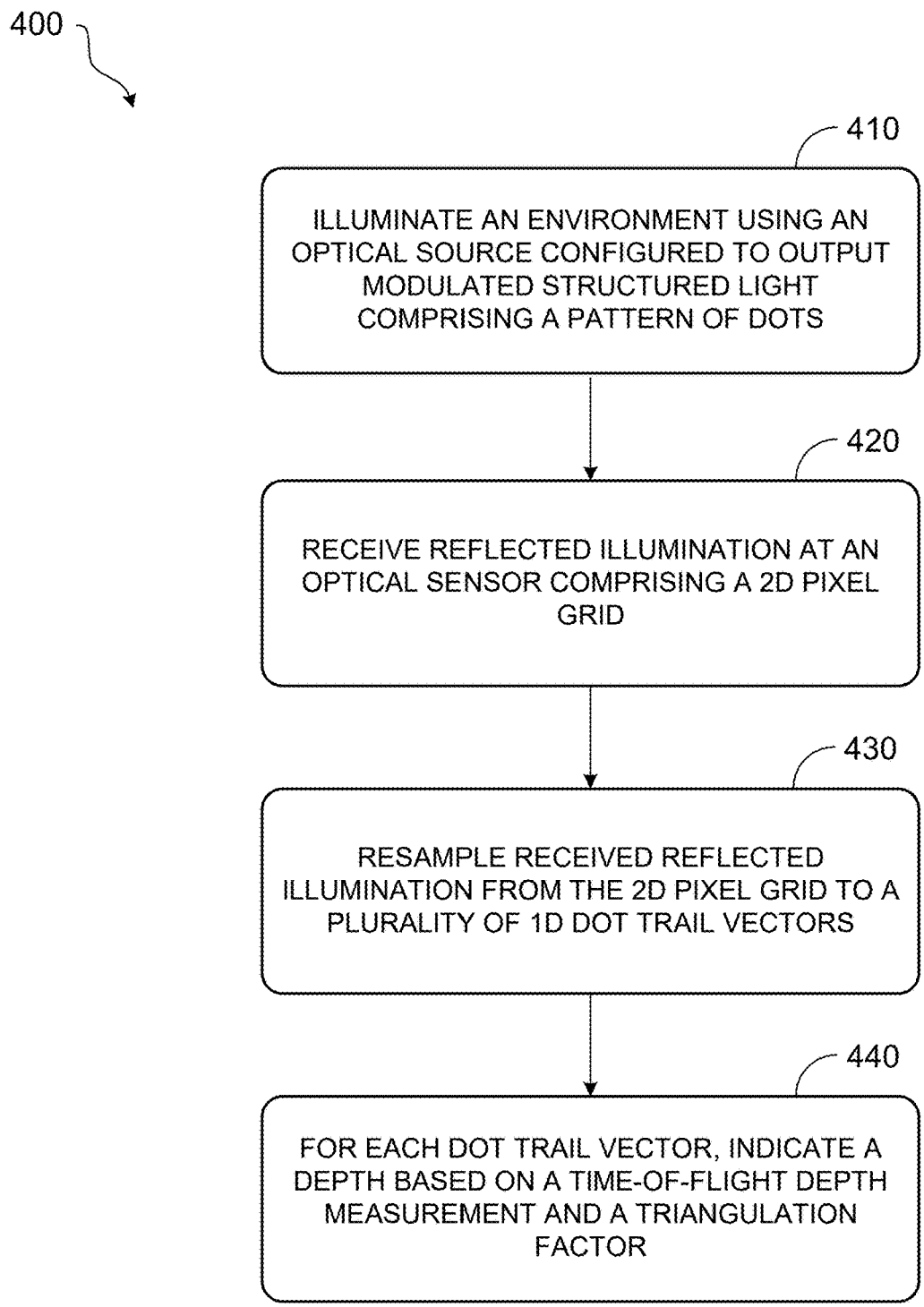
FIG. 4 shows a flow diagram for an example method for operating a depth imaging system.

FIG. 4 shows a flow diagram for an example method 400 for operating a depth imaging system, such as outward facing depth imaging device 234 and outward facing depth illuminating device 236, and/or depth imaging system 300.

At 410, method 400 includes illuminating an environment using an optical source configured to output modulated structured light comprising a pattern of dots. In some examples, a single optical source emits a modulated structured light pattern. In other examples, a first optical source outputs structured light and a second optical source outputs modulated light.

At 420, method 400 includes receiving reflected illumination at an optical sensor comprising a 2D pixel grid. The received reflected illumination may comprise both active brightness data and ToF data. The raw ToF data is then refined with a depth engine into processed depth data.

At 430, method 400 includes resampling received reflected illumination from the 2D pixel grid to a plurality of 1D dot trail vectors. In other words, a dense image may be resampled along known epipolar lines. Resampling may include downsampling from 2D to 1D. Downsampling received reflected illumination from the 2D pixel grid to a plurality of 1D dot trail vectors is based at least on a calibration between the optical source and the optical sensor. This calibration may be dynamically updated as the system changes over time due to changes in temperature, device aging, elastic or plastic deformation and/or other factors. Downsampling received reflected illumination from the 2D pixel grid to a plurality of 1D dot trail vectors may include downsampling depth and filtered active brightness values generated based at least on received reflected illumination for each pixel of the 2D pixel grid. Each 1D dot trail vector comprises a plurality of samples, each sample corresponding to a specific distance or range of distances between a surface of the environment and the optical sensor. In some examples, downsampling received reflected illumination from the 2D pixel grid to the plurality of 1D dot trail vectors includes downsampling one or more of raw depth sensor measurements, complex domain depth measurements, and wrapped phase values generated based at least on received reflected illumination for each pixel of the 2D pixel grid.

Rather than searching across the entire pixel grid for dots, the image data is downsampled to include one dot trail vector for each dot of the structured light pattern. For example, there may be on the order of 7000 dots in some examples, with more or fewer dots in other examples. Given an optical sensor and an optical source with a known spatial relationship (e.g., calibration data) each vector includes a number of samples (e.g., 40 samples) that each correspond with a certain depth in the Z dimension (e.g., ranging from a few centimeters to a few meters). The problem then becomes locating each dot along its vector. In practice, there are often so many dots that their trails overlap and trying to determine dot location from active brightness information alone is ambiguous. As such, depth information from the ToF imaging is applied to identify each dot location.

Figure 5:
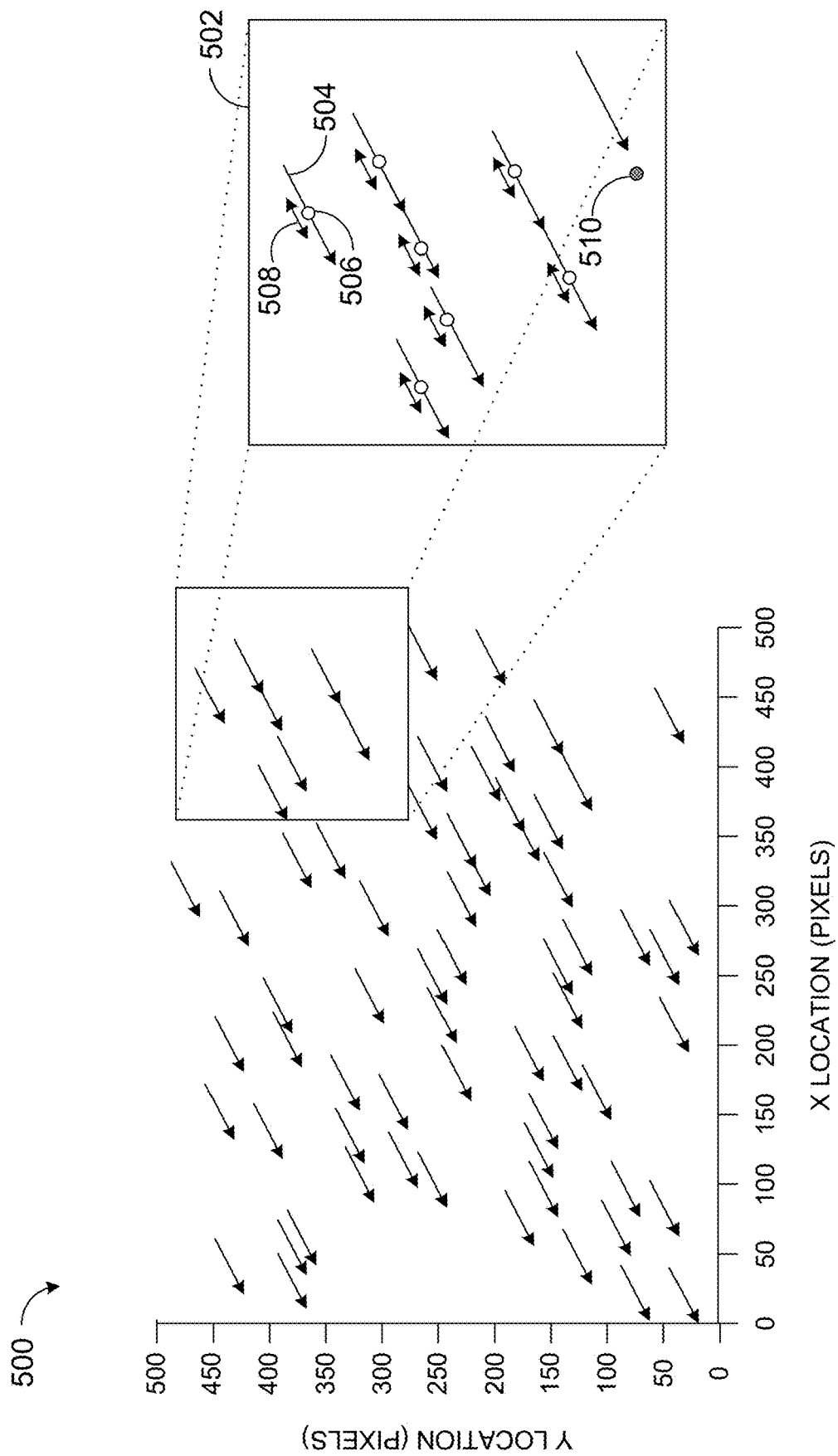
FIG. 5 shows an example plot of 1D dot trail vectors on a 2D pixel grid.

FIG. 5 shows an example plot 500 of 1D dot trail vectors on a 2D pixel grid. A limited number of 1D dot trail vectors are shown for simplicity purposes. A more detailed inset is shown at 502. The dot trail vectors are considered one dimensional for the purposes of description herein. The offsets in X and Y between the optical source and the optical sensor determine the orientation of those dot trail vectors in two dimensions. However, due to lens distortion, the dot trail vectors will generally have some curvature, barring a perfectly rectilinear lens. As shown, the dot trail vectors are diagonal, due to an offset between the optical source and the optical sensor in both the X and Y dimensions. If the optical source and optical sensor were offset in the X dimension only, the dot trail vectors would be horizontal. By downsampling in this way, triangulation data can be used to augment ToF depth for more accurate depth measurements.

For a given dot trail vector, such as dot trail vector 504, a dot (506) may be positioned at any point (e.g., pixel) along the dot trail vector for a given frame. This only requires operations on 1D vectors, which have lower compute than operating in two dimensions. There is uncertainty (508) along a dot trail vector, but not in the normal direction. In high density dot projections, some of the dot trail vectors may overlap. Example computations for dealing with potential ambiguity that arises from overlap are described herein. Detection errors, such as dot 510, do not result in assigning additional dots, but the dot may be assigned a value out of the range of possible depths and in some examples will be invalidated.

Figure 6:
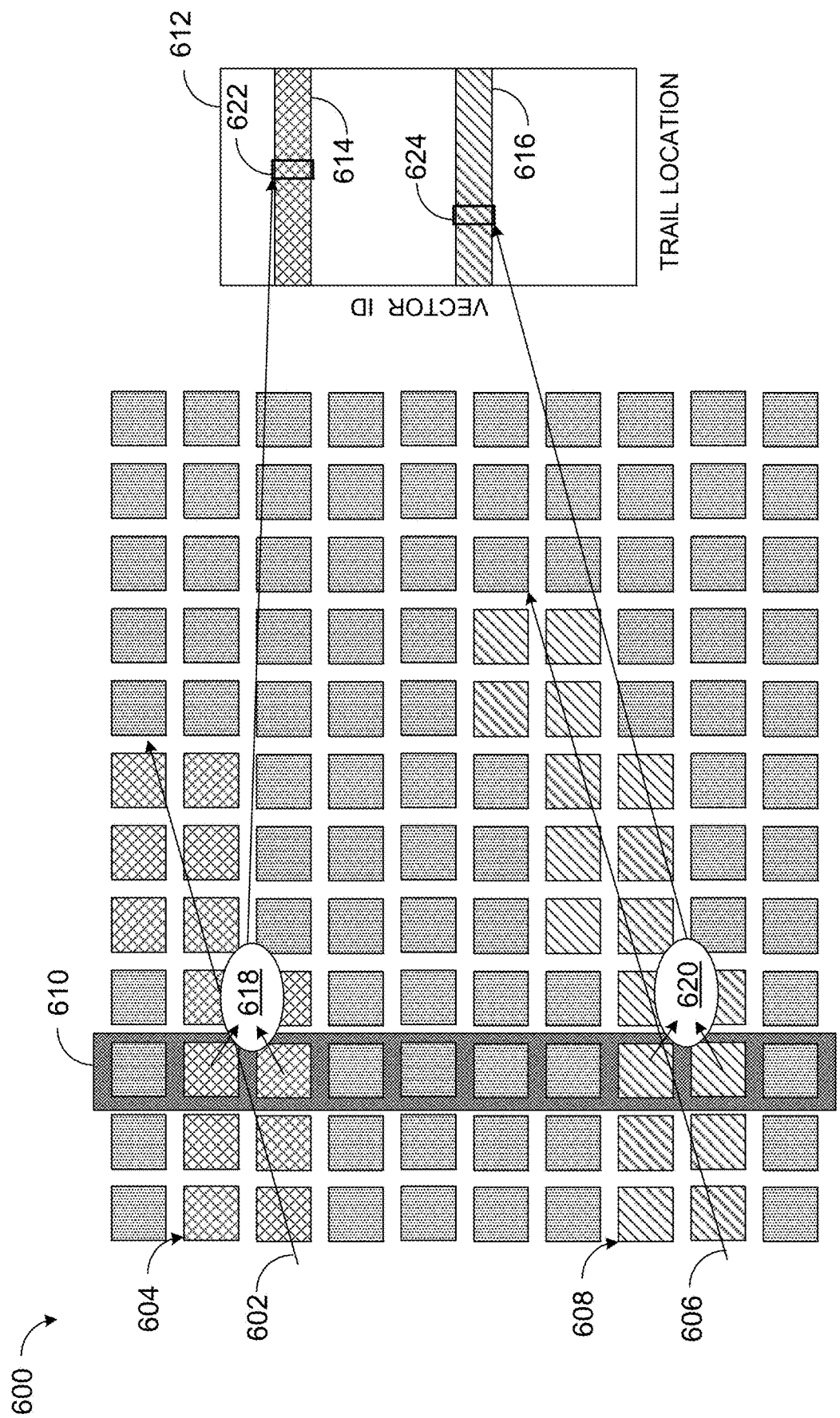
FIG. 6 schematically shows an example process for extracting 1D dot trail vectors from a 2D image.

FIG. 6 schematically shows an example process for extracting 1D dot trail vectors from a 2D image. A 2D pixel grid 600 is shown. A first dot trail vector 602 intersects with a plurality of pixels 604 (cross hatched). A second dot trail vector 606 intersects with a plurality of pixels 608 (diagonal lines).

Downsampling received reflected illumination from the 2D pixel grid to a plurality of 1D dot trail vectors may include scanning the 2D pixel grid along a scanning dimension. In this example, scanning proceeds along column 610 and then shifts to the new column, though in other examples, scanning may proceed along rows. An approach may be selected based upon such factors as memory access efficiency, the natural orientation of the sensor and the orientation of the baseline relative to that the natural orientation of the sensor.

Each dot trail vector that intersects with the scanning dimension is recorded. A dot trail vector table 612 may be stored in memory plotting dot trail vector samples against relative trail locations (e.g., samples/pixels). In this example, dot trail vector 602 maps to data row 614 and dot trail vector 606 maps to data row 616. For each relative trail location, ToF depth, filtered or unfiltered active brightness and other parameters may be stored in a destination index in dot trail vector table 612. In some examples the mapping of pixel locations in the image to dot trail vector table may be precomputed and stored in a look-up table (LUT).

In some examples, multiple pixels for a dot trail vector may intersect with column 610. As such, values between pixels that are adjacent in the scanning dimension may be interpolated, as shown at 618 and 620. Interpolated values for filtered active brightness and depth may then be stored in a dot trail table as shown at 622 and 624. In examples where the pixel location mapping to the dot trail vector table is stored in a look-up table (LUT), the coefficients for the interpolation may also be precomputed and stored in a similar fashion. In other implementations, the interpolation may be in two dimensions, not just the single dimension shown in 600. In other examples of the method various spatial convolutional kernels or other approaches may be used to sample from the data in the 2D pixel grid.

In other examples, downsampling received reflected illumination from the 2D pixel grid to a plurality of 1D dot trail vectors comprises raster scanning the 2D pixel grid. This approach may reduce compute requirements to involve tracking dots from frame to frame, effectively making dot detection less than a 1D problem.

Returning to FIG. 4, at 440, method 400 includes for each dot trail vector, indicating a depth based on a time-of-flight depth measurement and a triangulation factor. The triangulation factor may be based on the depths for each sample of the dot trail vector. Final depth measurements may be based on ToF, triangulation, or both. Example methods for indicating depth are described herein and with regard to FIGS. 8 and 9.

Figure 7A:
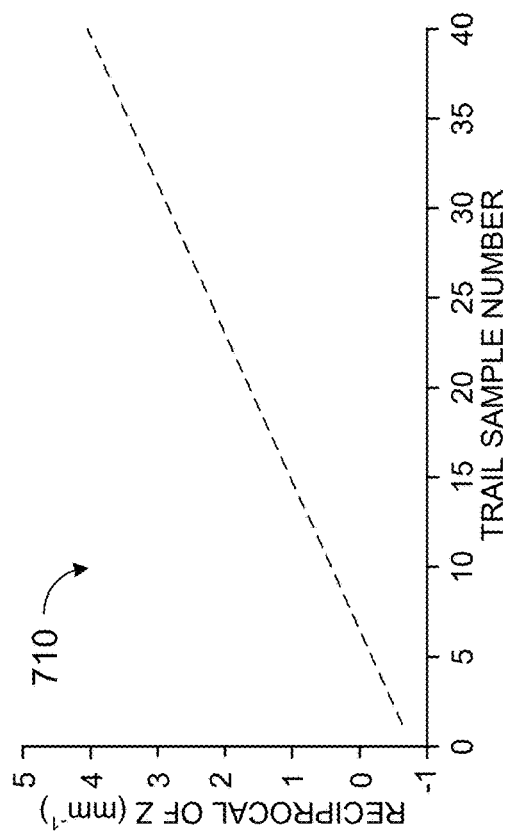
FIG. 7A is an example plot of time-of-flight depth versus trail sample number.

FIG. 7A is an example plot 700 of time-of-flight depth versus trail sample number, such as described for data row 614 or 616. For a given dot trail vector, the Z distance in mm as determined by ToF is plotted at each trail sample number, e.g., plot 700 is the epipolar line for the dot. As shown, there is a fairly consistent depth estimate across the dot vector trail, excepting for a phase unwrapping error at 702 and depth processing errors at 704 and 706. Depth processing errors may occur when the ToF data is internally inconsistent. The ToF depth may have an associated standard deviation in the Z dimension, along with pixel localization noise, etc. Because the dot pattern is sparse, in some implementations there may be only limited valid data—depending on the processing approach, there may be missing depth data between pixels, at low SNR or due to other factors. Depending on the resampling of the image, the samples may not be equally spaced along the epipolar line—for example, if using a nearest neighbor approach without interpolation.

Figure 7B:
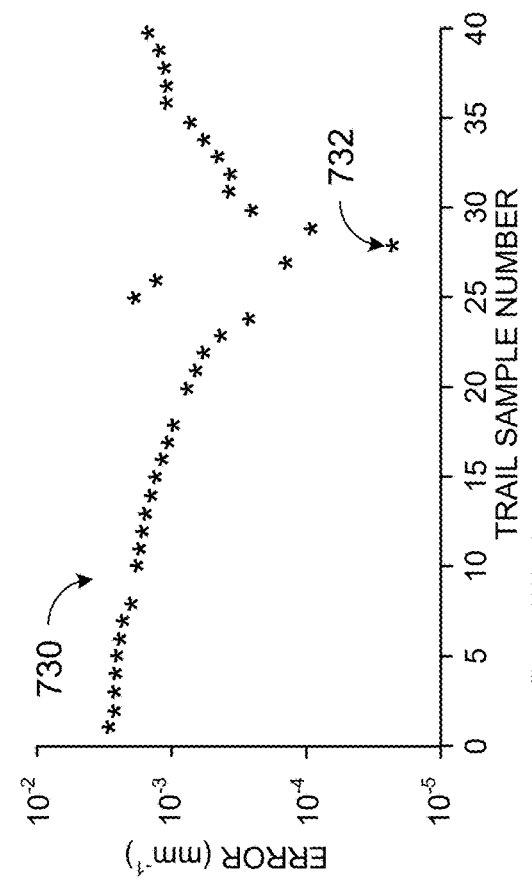
FIG. 7B is an example plot of the reciprocal of triangulation depth versus trail sample number.

FIG. 7B is an example plot 710 of the reciprocal of triangulation depth versus trail sample number. For the dot trail vector, a particular Z distance can be estimated based on the triangulation information and the calibration data. In other words, each trail sample number has an associated estimated depth. From geometry, the reciprocal of Z is proportional to the distance in pixels along the epipolar line, and the dot trail vector may not necessarily have equally spaced samples along the epipolar line. The reciprocal of Z (which is roughly proportional to pixel location) can be advantageous because when comparing the triangulation data to the ToF data the pixel location uncertainty typically dominates. Also this provides a linear or near linear slope with the ability to go past infinity (corresponding to 1/z values below zero), which can be challenging to handle with a non-reciprocal notation due to the discontinuity involved. This plot is used as triangulation depth and is representative of a triangulation factor.

Figure 7C:
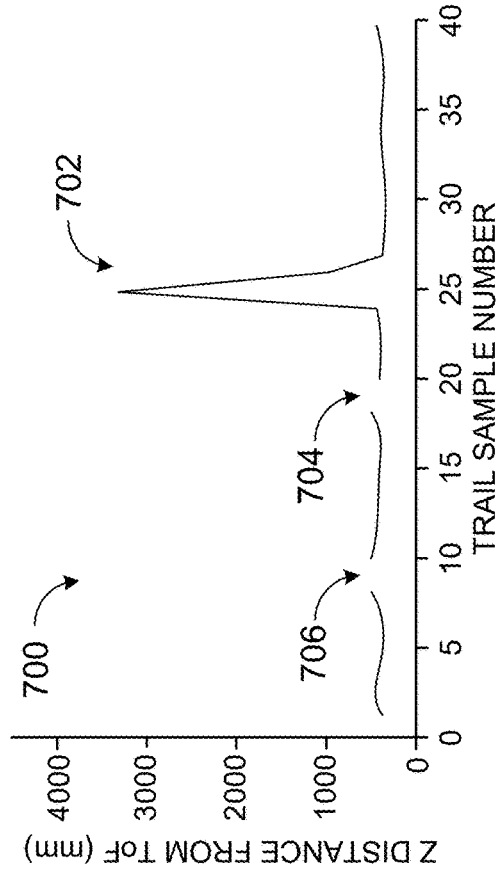
FIG. 7C is an example plot correlating time-of-flight depth and triangulation depth across trail sample number.

FIG. 7C is an example plot 720 correlating time-of-flight depth 722 and triangulation depth 724 across trail sample number. Co-plotting ToF depth and triangulation depth allows for establishing a correlation between the two depth measurements. The true dot location lies somewhere along the dot trail vector at a trail sample number (or between trail sample numbers). Where the time-of-flight depth 722 and triangulation depth 724 intersect (assuming not within erroneous data) corresponds to the true distance, as the dot location along the dot trail vector is consistent with the ToF depth for that particular location.

Figure 8:
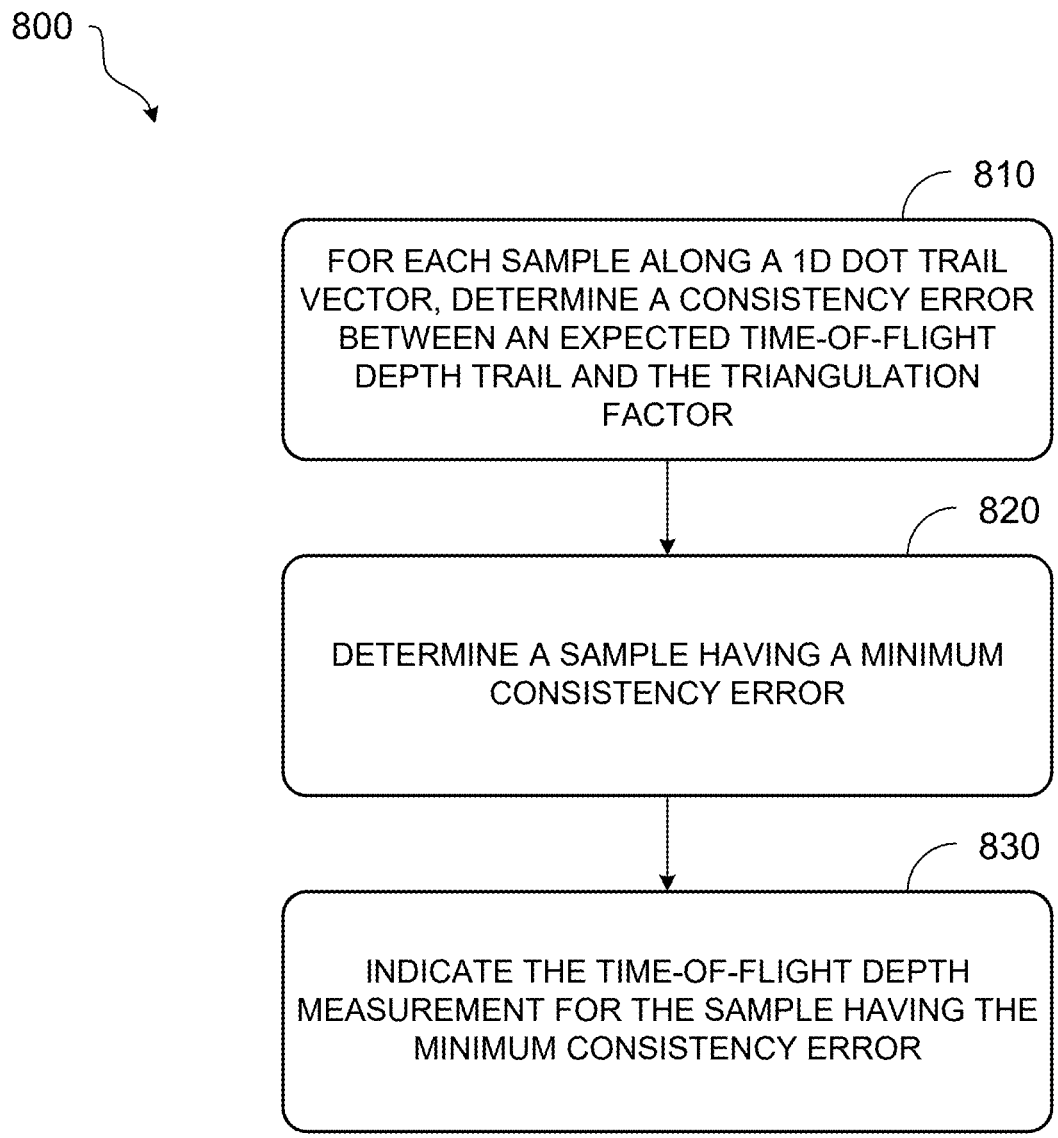
FIG. 8 shows a flow diagram for an example method for deriving depth information from time-of-flight data and a triangulation factor for a 1D dot trail vector.

FIG. 8 shows a flow diagram for an example method 800 for deriving depth information from time-of-flight data and a triangulation factor for a 1D dot trail vector. Method 800 may be performed in concert with method 400 as an example of indicating a depth based on a time-of-flight depth measurement and a triangulation factor for a dot trail vector.

At 810, method 800 includes, for each sample along a 1D dot trail vector, determining a consistency error between an expected time-of-flight depth trail and the triangulation factor. There are multiple types of consistency error metric that can be used, including difference in reciprocal Z or reciprocal radial distance, difference in Z, difference in radial distance, or Euclidian distance in 3D space. As used herein to describe consistency error, the terms "minimum", "minimize" and variants thereof do not necessarily refer to an absolute or true minimum value, but rather indicate the termination of an optimization process according to predetermined criteria.

Figure 7D:
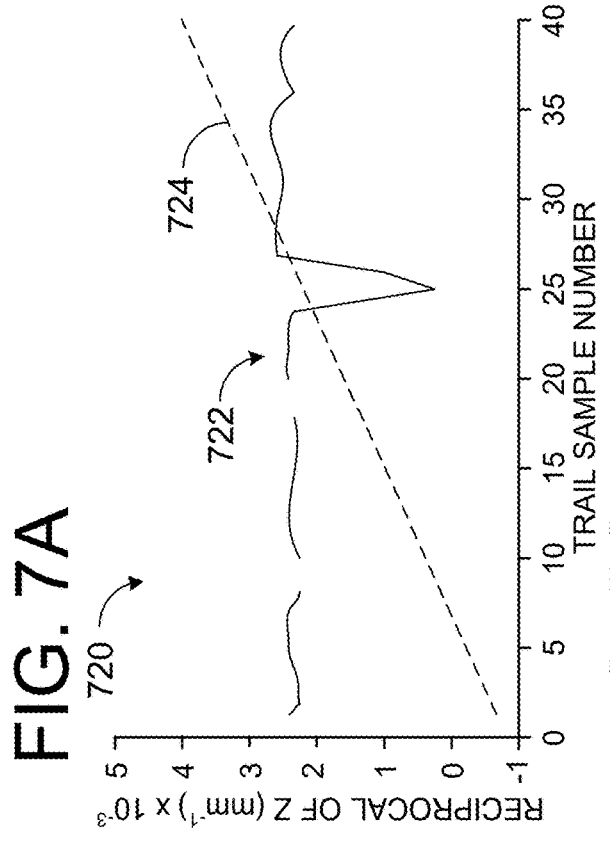
FIG. 7D is an example plot of consistency error between time-of-flight depth and triangulation depth across trail sample number.

As an example, FIG. 7D is an example plot 730 of consistency error (in reciprocal millimeters) between time-of-flight depth and triangulation depth across trail sample number. Plot 730 represents consistency error at each trail sample number for ToF depth 722 and triangulation depth 724.

Returning to FIG. 8, at 820, method 800 includes determining a sample having a minimum consistency error. As shown in plot 730, sample 28 (as indicated at 732) has the minimum consistency error for each trail sample.

At 830, method 800 indicating the time-of-flight depth measurement for the sample having the minimum consistency error. For example, the Z distance from ToF indicated in plot 700 for sample 28 may be indicated. In this way, ToF depth can be reinforced by a triangulation factor to give a rapid, accurate depth measurement.

Figure 9:
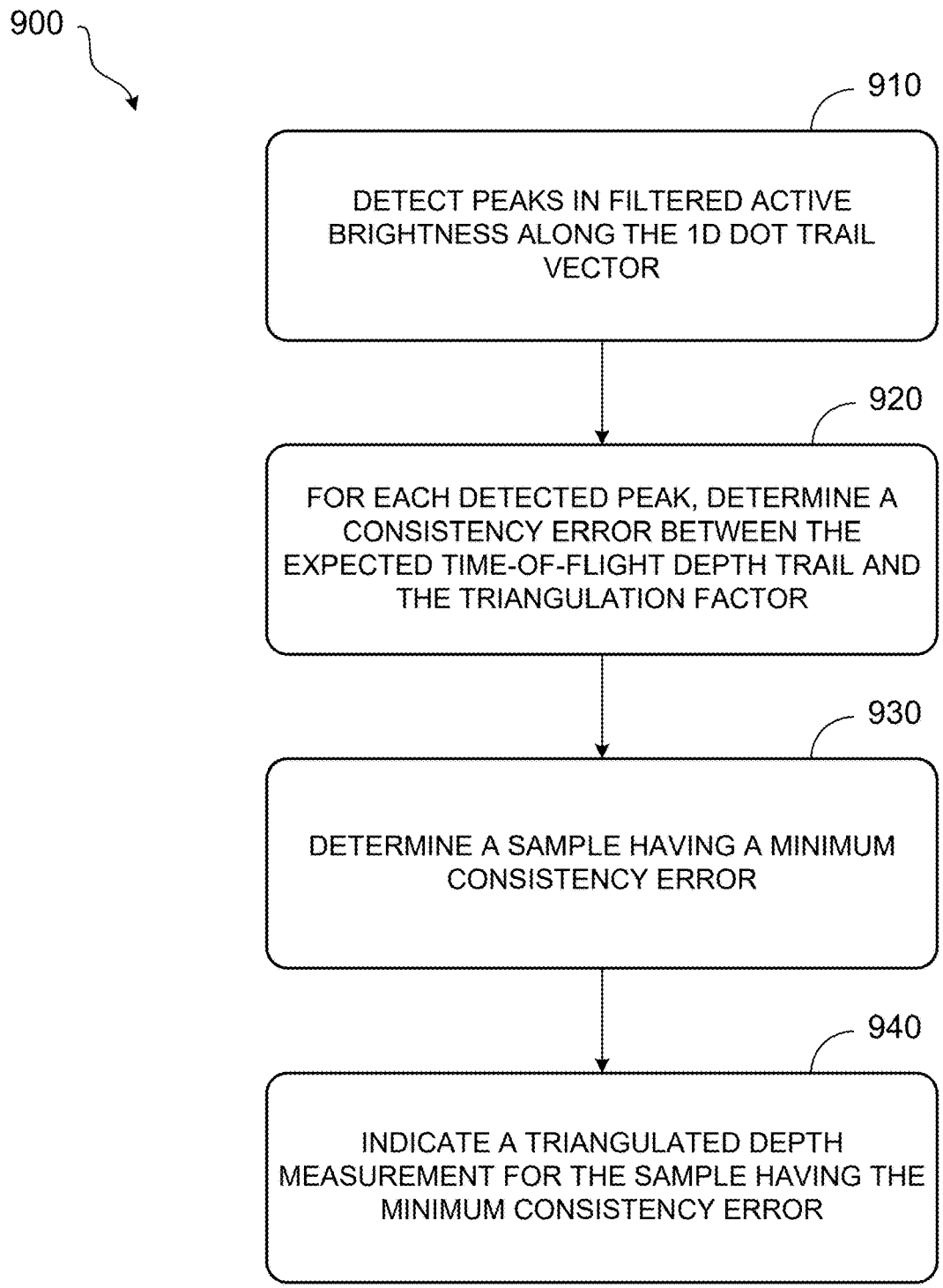
FIG. 9 shows a flow diagram for an example method for deriving depth information from time-of-flight data and active brightness data for a 1D dot trail vector.

FIG. 9 shows a flow diagram for an example method 900 for deriving depth information from time-of-flight data and active brightness data for a 1D dot trail vector. Method 900 may be performed in concert with method 400 as an example of indicating a depth based on a time-of-flight depth measurement and a triangulation factor for a dot trail vector. In this example, indicating a depth is further based at least on filtered active brightness peak detection along the 1D dot trail vector. At 910, method 900 includes detecting peaks in filtered active brightness along a 1D dot trail vector.

Figure 10A:
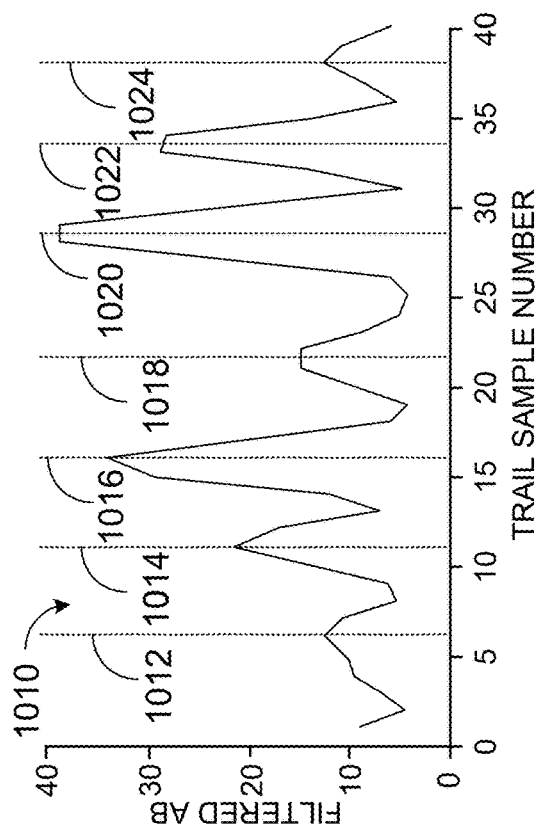
FIG. 10A is an example plot of time-of-flight depth versus trail sample number.

As described with regard to FIG. 7A, time-of-flight depth measurements are also recorded for each 1D dot trail. FIG. 10A is an example plot 1000 of time-of-flight depth versus trail sample number. For a given dot trail vector, the Z distance in mm as determined by ToF is plotted at each trail sample number. A phase unwrapping error is shown at 1002 and depth processing errors are shown at 1004 and 1006.

Figure 10B:
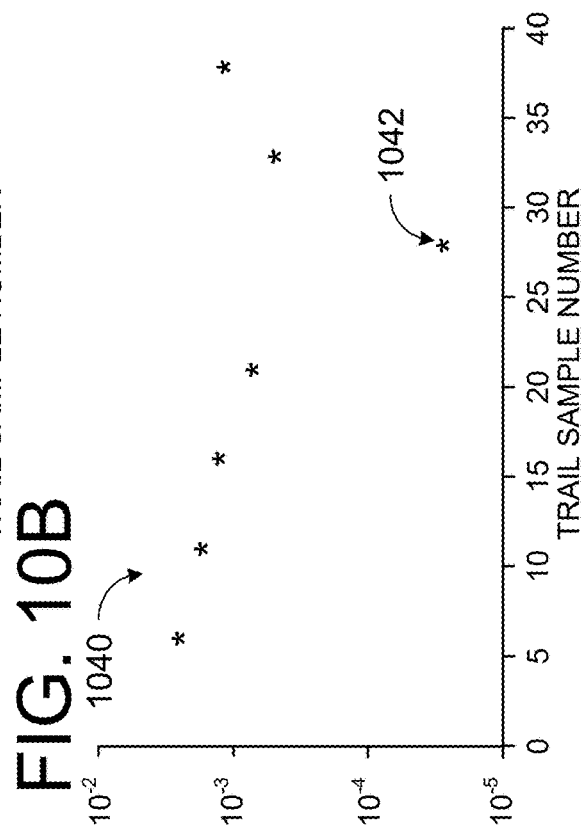
FIG. 10B is an example plot of active brightness versus trail sample number.

FIG. 10B is an example plot 1010 of filtered active brightness versus trail sample number. A plurality of peaks (1012, 1014, 1016, 1018, 1020, 1022, and 1024) are indicated. Each dot trail intersects a number of dots in the active brightness domain, yielding multiple peaks. As such, determining depth is more complicated than selecting a single or highest peak. A correlation between triangulation depth and ToF depth can be performed to determine a most consistent depth measurement. However, unlike method 900 wherein all trail samples were evaluated, here, only trail samples correlating with active brightness need be evaluated, thus reducing the amount of compute. The interstitial trail samples can be ignored.

Further, peak locations can be subresolved between trail samples and are not limited to discrete values. For example, peak 1016 may be located at trail sample 16.782, rather than trail sample 16. In this way, a continuously valued range can be calculated to determine a triangulation-based depth.

Figure 10C:
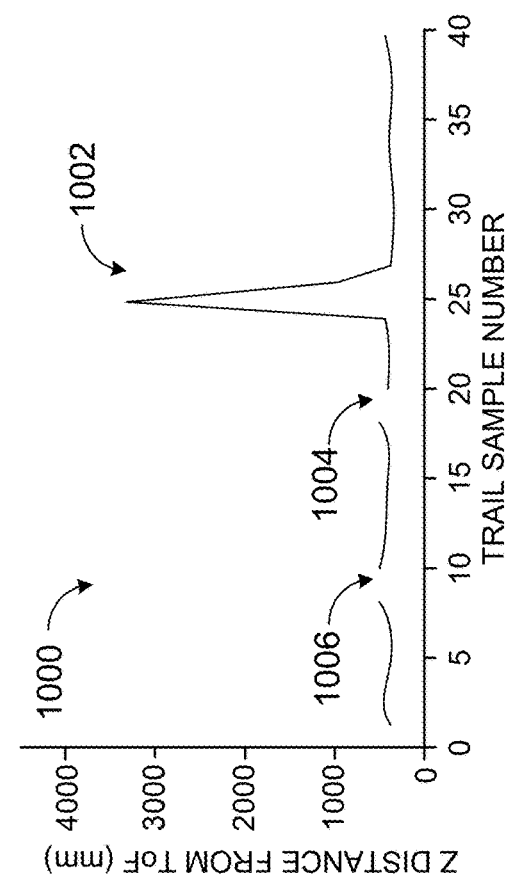
FIG. 10C is an example plot correlating time-of-flight depth and triangulation depth for active brightness peaks.

FIG. 10C is an example plot 1030 correlating time-of-flight depth and triangulation depth for active brightness peaks. ToF depth values are shown at 1032 (circles) and triangulation depth values are shown at 1034 (stars). Similarly to plot 720, where the time-of-flight depth 1032 and triangulation depth 1034 intersect (assuming not within erroneous data) corresponds to the true distance.

Figure 10D:
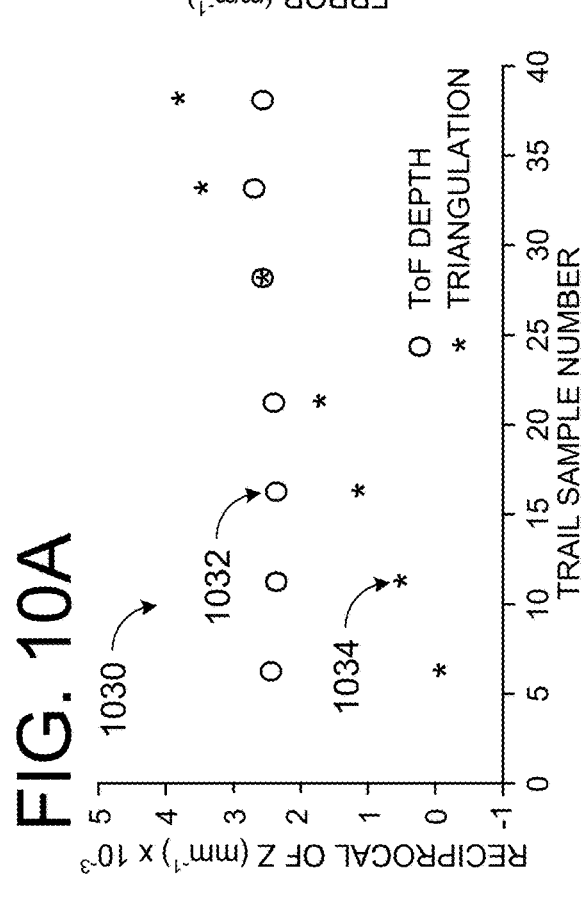
FIG. 10D is an example plot of consistency error between time-of-flight depth and triangulation depth for active brightness peaks.

Returning to FIG. 9, at 920, method 900 includes, for each peak, determining a consistency error between the expected time-of-flight depth trail and the triangulation factor. FIG. 10D is an example plot 1040 of consistency error between time-of-flight depth and triangulation depth for active brightness peaks. As shown for FIG. 7D, the same approach is used to determine consistency error (in reciprocal millimeters). However, rather than determining a consistency error for every sample along a densely samples dot trail vector, only a few points along that line need to be compared.

At 930, method 900 includes determining a sample having a minimum consistency error. For the example of plot 1040, sample 28 (indicated at 1042) has the minimum consistency error. With only a few points to compare, the result is fairly obvious as the data points have a lot of separation from each other.

At 940, method 900 includes indicating a triangulated depth measurement for the sample having the minimum consistency error. For example, the Z distance from triangulation indicated in plot 1030 for sample 28 may be indicated. In this way, triangulation depth can be used to generate a rapid, accurate depth measurement that is invariant to subsurface diffusion.

In some examples, the approach to indicating a depth may be adjusted based on an estimated depth. Triangulation works very well at close distances, whereas time-of-flight works relatively better at further distances. As such, method 800 may be used at estimated depths above a threshold, while method 900 may be used at estimated depths below a threshold.

In another example of the invention, raw measurements from the camera may be converted to trail vectors or intermediate values used in calculating depth. In one case the complex domain range measurements for each modulation frequency, which encode the phase and amplitude of the backreflected modulated signal at each frequency, are converted to trails and the triangulation factor is used as an input to a calculation to remove cyclic phase ambiguity from the raw measurements and convert the measurements to range by scaling and weighted averaging. The phase unwrapping calculation is able to work at lower SNRs by using the extra information encoded by the triangulation factor. In some such examples, the depth value is determined by comparing the consistency of the phase measurements unwrapped using the triangulation factor and choosing the depth value corresponding to the lowest error/most consistent unwrapped phase measurements.

Figure 11:
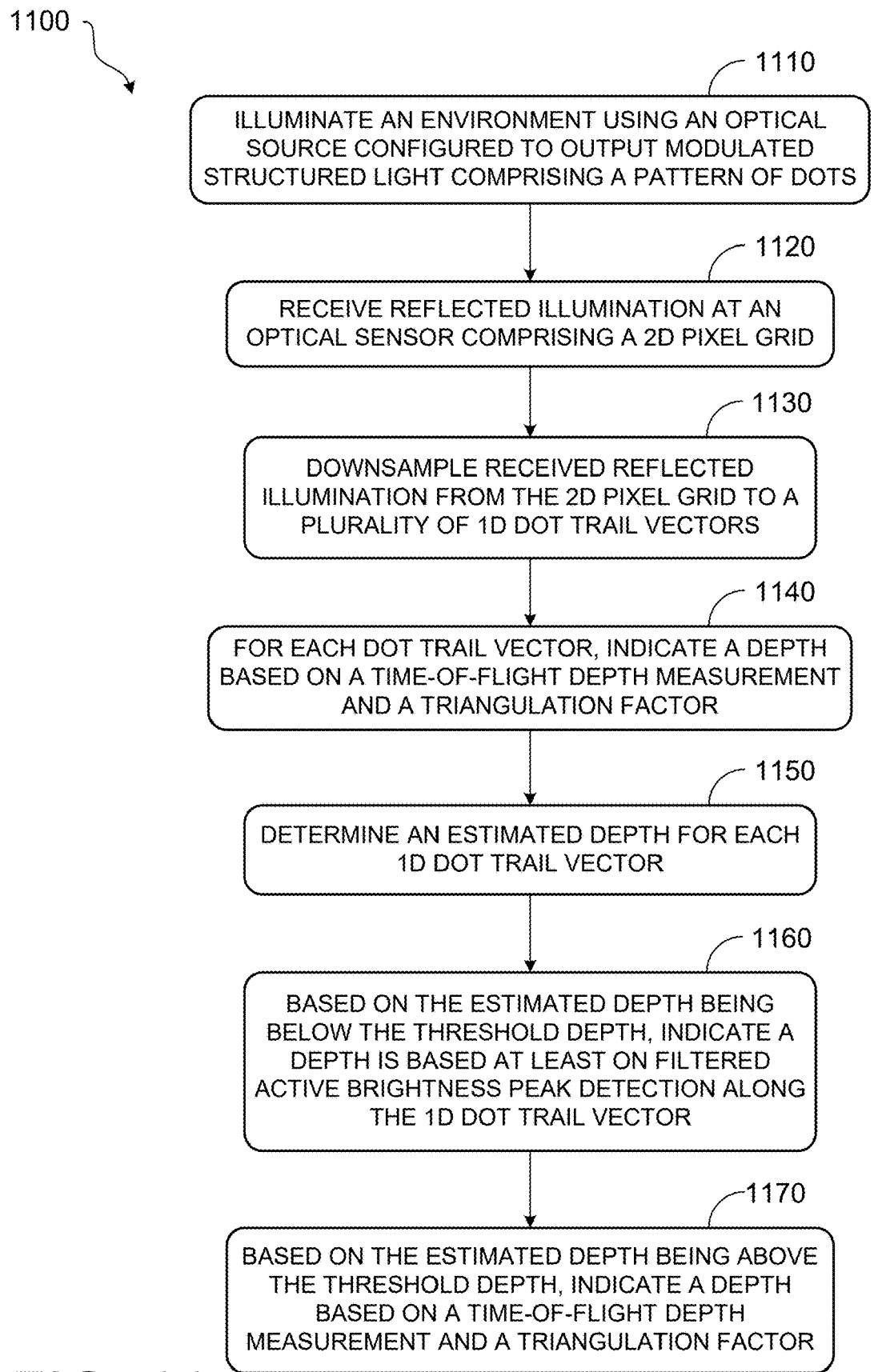
FIG. 11 shows a flow diagram for an example method for operating a depth imaging system.

FIG. 11 shows a flow chart for an example method 1100 for operating a depth imaging system. At 1110, method 1100 includes illuminating an environment using an optical source configured to output modulated structured light comprising a pattern of dots. For example, the environment may be illuminated as described at 410 of method 400.

At 1120, method 1100 includes receiving reflected illumination at an optical sensor comprising a 2D pixel grid. For example, reflected illumination may be received as described at 420 of method 400. At 1130, method 1100 includes downsampling received reflected illumination from the 2D pixel grid to a plurality of 1D dot trail vectors. For example, received reflected illumination may be resampled at described at 430 of method 400.

At 1140, method 1100 includes determining an estimated depth for each 1D dot trail vector. In some examples, an estimated depth may be interpolated based on ToF depth and/or triangulation depth for a 1D dot trail vector. In some examples, an estimated depth may be determined based on depth values for a previous depth image.

At 1150, method 1100 includes, based on the estimated depth being below the threshold depth, indicating a depth is based at least on filtered active brightness peak detection along the 1D dot trail vector.

Based on the estimated depth being below the threshold depth, peaks may be determined in filtered active brightness along the 1D dot trail vector. For each peak, a consistency error may be determined between the expected time-of-flight depth trail and the triangulation factor. A sample having a minimum consistency error may be determined. A triangulated depth measurement may be indicated for the sample having the minimum consistency error.

At 1160, method 1100 includes, based on the estimated depth being above the threshold depth, indicating a depth based on a time-of-flight depth measurement and a triangulation factor. Based on the estimated depth being above the threshold depth, for each sample along the 1D dot trail vector, a consistency error may be determined between an expected time-of-flight depth trail and the triangulation factor. A sample having a minimum consistency error may be determined. The time-of-flight depth measurement may be indicated for the sample having the minimum consistency error.

Reducing the search space to a 1D search for the dots significantly reduces the compute power needed to locate the dots. Further, this approach increases the range at which the dots can be detected. Using triangulation in a ToF sensor can aid in selecting a correct depth for a dot or even produce a depth value at close range. Based on the consistency between the triangulation information and the depth information, it can be determined that a dot exists at a certain point even if it is impossible to discern from the image data. Previously, Laplacian of Gaussian type dot detection could be performed on the active brightness image and the intensity image to determine where the dots are. Such high compute algorithms are unnecessary using the subject methods.

The disclosed approaches reduce compute resources by focusing on 1D detection. Explicit dot detection is not required. Image data may be processed with no convolutions, and with as little as a single pass scan of the image. The resulting depth measurements demonstrate increased accuracy in numerous lighting situations and may allow for detection over a longer range of depths. This methodology solves the subsurface diffusion problem in iToF sensors.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
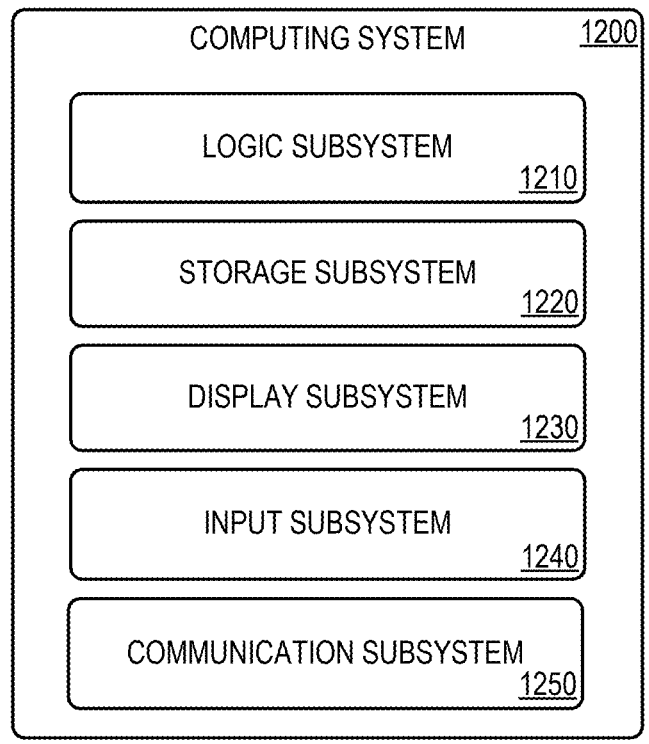
FIG. 12 schematically shows an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1210 and a storage machine 1220. Computing system 1200 may optionally include a display subsystem 1230, input subsystem 1240, communication subsystem 1250, and/or other components not shown in FIG. 12. Head mounted display device 200 may be an example of computing system 1200. Controller 230 may be an example of logic machine 1210.

Logic machine 1210 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1220 includes one or more physical devices configured to hold instructions executable by the logic machine to implement the methods and processes described herein. When such methods and processes are implemented, the state of storage machine 1220 may be transformed—e.g., to hold different data.

Storage machine 1220 may include removable and/or built-in devices. Storage machine 1220 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1220 may include volatile, nonvolatile, dynamic, static, read/write, read-only, random-access, sequential-access, location-addressable, file-addressable, and/or content-addressable devices.

It will be appreciated that storage machine 1220 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1210 and storage machine 1220 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1210 executing instructions held by storage machine 1220. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1230 may be used to present a visual representation of data held by storage machine 1220. This visual representation may take the form of a graphical user interface (GUI). As the herein described methods and processes change the data held by the storage machine, and thus transform the state of the storage machine, the state of display subsystem 1230 may likewise be transformed to visually represent changes in the underlying data. Display subsystem 1230 may include one or more display devices utilizing virtually any type of technology. Such display devices may be combined with logic machine 1210 and/or storage machine 1220 in a shared enclosure, or such display devices may be peripheral display devices.

When included, input subsystem 1240 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1250 may be configured to communicatively couple computing system 1200 with one or more other computing devices. Communication subsystem 1250 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

In one example, a method for operating a depth imaging system comprises illuminating an environment using an optical source configured to output modulated structured light comprising a pattern of dots; receiving reflected illumination at an optical sensor comprising a 2D pixel grid; downsampling received reflected illumination from the 2D pixel grid to a plurality of 1D dot trail vectors; and for each dot trail vector, indicating a depth based on a time-of-flight depth measurement and a triangulation factor. In such an example, or any other example, downsampling received reflected illumination from the 2D pixel grid to the plurality of 1D dot trail vectors is additionally or alternatively based at least on a calibration between the optical source and the optical sensor. In any of the preceding examples, or any other example, downsampling received reflected illumination from the 2D pixel grid to the plurality of 1D dot trail vectors additionally or alternatively includes downsampling depth and filtered active brightness values generated based at least on received reflected illumination for each pixel of the 2D pixel grid. In any of the preceding examples, or any other example, the method additionally or alternatively comprises scanning the 2D pixel grid along a scanning dimension; recording each dot trail vector that intersects with the scanning dimension; interpolating values between pixels that are adjacent in the scanning dimension; and storing values for filtered active brightness and depth in a dot trail table. In any of the preceding examples, or any other example, downsampling received reflected illumination from the 2D pixel grid to the plurality of 1D dot trail vectors additionally or alternatively includes downsampling one or more of raw depth sensor measurements, complex domain depth measurements, and wrapped phase values generated based at least on received reflected illumination for each pixel of the 2D pixel grid. In any of the preceding examples, or any other example, each 1D dot trail vector additionally or alternatively comprises a plurality of samples, each sample corresponding to a specific distance between a surface of the environment and the optical sensor. In any of the preceding examples, or any other example, the method additionally or alternatively comprises, for each sample along a 1D dot trail vector, determining a consistency error between an expected time-of-flight depth trail and the triangulation factor; determining a sample having a minimum consistency error; and indicating the time-of-flight depth measurement for the sample having the minimum consistency error. In any of the preceding examples, or any other example, indicating the depth is additionally or alternatively based at least on filtered active brightness peak detection along the 1D dot trail vector. In any of the preceding examples, or any other example, the method additionally or alternatively comprises detecting peaks in filtered active brightness along the 1D dot trail vector; for each detected peak, determining a consistency error between an expected time-of-flight depth trail and the triangulation factor; determining a sample having a minimum consistency error; and indicating a triangulated depth measurement for the sample having the minimum consistency error.

In another example, a depth imaging system comprises an optical source configured to output modulated structured light comprising a pattern of dots; an optical sensor comprising a 2D pixel grid; a controller configured with instructions to illuminate an environment using the optical source; receive reflected illumination at the optical sensor; downsample received reflected illumination from the 2D pixel grid to a plurality of 1D dot trail vectors; and for each dot trail vector, indicate a depth based on a time-of-flight depth measurement and a triangulation factor. In such an example, or any other example, downsampling received reflected illumination from the 2D pixel grid to the plurality of 1D dot trail vectors is additionally or alternatively based at least on a calibration between the optical source and the optical sensor. In any of the preceding examples, or any other example, downsampling received reflected illumination from the 2D pixel grid to the plurality of 1D dot trail vectors additionally or alternatively includes downsampling depth and filtered active brightness values generated based at least on received reflected illumination for each pixel of the 2D pixel grid. In any of the preceding examples, or any other example, the controller is additionally or alternatively configured with instructions to scan the 2D pixel grid along a scanning dimension; record each dot trail vector that intersects with the scanning dimension; interpolate values between pixels that are adjacent in the scanning dimension; and store values for filtered active brightness and depth in a dot trail table. In any of the preceding examples, or any other example, downsampling received reflected illumination from the 2D pixel grid to a plurality of 1D dot trail vectors additionally or alternatively comprises raster scanning the 2D pixel grid. In any of the preceding examples, or any other example, each 1D dot trail vector additionally or alternatively comprises a plurality of samples, each sample corresponding to a specific distance between a surface of the environment and the optical sensor. In any of the preceding examples, or any other example, the controller is additionally or alternatively configured with instructions to, for each sample along a 1D dot trail vector, determine a consistency error between an expected time-of-flight depth trail and the triangulation factor; determine a sample having a minimum consistency error; and indicate the time-of-flight depth measurement for the sample having the minimum consistency error. In any of the preceding examples, or any other example, indicating the depth is additionally or alternatively based at least on filtered active brightness peak detection along the 1D dot trail vector. In any of the preceding examples, or any other example, the controller is additionally or alternatively configured with instructions to detect peaks in filtered active brightness along the 1D dot trail vector; for each peak, determine a consistency error between an expected time-of-flight depth trail and the triangulation factor; determine a sample having a minimum consistency error; and indicate a triangulated depth measurement for the sample having the minimum consistency error.

In yet another example, a method for operating a depth imaging system, comprises illuminating an environment using an optical source configured to output modulated structured light comprising a pattern of dots; receiving reflected illumination at an optical sensor comprising a 2D pixel grid; downsampling received reflected illumination from the 2D pixel grid to a plurality of 1D dot trail vectors; determining an estimated depth for each 1D dot trail vector; based on the estimated depth being below a threshold depth, indicating the depth is based at least on filtered active brightness peak detection along the 1D dot trail vector; and based on the estimated depth being above the threshold depth, indicating a depth based on a time-of-flight depth measurement and a triangulation factor. In such an example, or any other example, the method additionally or alternatively comprises, based on the estimated depth being below the threshold depth, detecting peaks in filtered active brightness along the 1D dot trail vector; for each peak, determining a consistency error between the expected time-of-flight depth trail and the triangulation factor; determining a sample having a minimum consistency error; and indicating a triangulated depth measurement for the sample having the minimum consistency error; and based on the estimated depth being above the threshold depth, for each sample along the 1D dot trail vector, determining the consistency error between the expected time-of-flight depth trail and the triangulation factor; determining the sample having the minimum consistency error; and indicating the time-of-flight depth measurement for the sample having the minimum consistency error.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a depth imaging system, comprising:
   illuminating an environment using an optical source configured to output modulated structured light comprising a pattern of dots;
   receiving reflected illumination at an optical sensor comprising a 2D pixel grid;
   downsampling received reflected illumination from the 2D pixel grid to a plurality of 1D dot trail vectors; and
   for each dot trail vector, indicating a depth based on a time-of-flight depth measurement and a triangulation factor.

2. The method of claim 1, wherein downsampling received reflected illumination from the 2D pixel grid to the plurality of 1D dot trail vectors is based at least on a calibration between the optical source and the optical sensor.

3. The method of claim 1, wherein downsampling received reflected illumination from the 2D pixel grid to the plurality of 1D dot trail vectors includes downsampling depth and filtered active brightness values generated based at least on received reflected illumination for each pixel of the 2D pixel grid.

4. The method of claim 3, further comprising:
   scanning the 2D pixel grid along a scanning dimension;
   recording each dot trail vector that intersects with the scanning dimension;
   interpolating values between pixels that are adjacent in the scanning dimension; and
   storing values for filtered active brightness and depth in a dot trail table.

5. The method of claim 1, wherein downsampling received reflected illumination from the 2D pixel grid to the plurality of 1D dot trail vectors includes downsampling one or more of raw depth sensor measurements, complex domain depth measurements, and wrapped phase values generated based at least on received reflected illumination for each pixel of the 2D pixel grid.

6. The method of claim 1, wherein each 1D dot trail vector comprises a plurality of samples, each sample corresponding to a specific distance between a surface of the environment and the optical sensor.

7. The method of claim 1, further comprising:
   for each sample along a 1D dot trail vector, determining a consistency error between an expected time-of-flight depth trail and the triangulation factor;
   determining a sample having a minimum consistency error; and
   indicating the time-of-flight depth measurement for the sample having the minimum consistency error.

8. The method of claim 1, wherein indicating the depth is further based at least on filtered active brightness peak detection along the 1D dot trail vector.

9. The method of claim 8, further comprising:
   detecting peaks in filtered active brightness along the 1D dot trail vector;
   for each detected peak, determining a consistency error between an expected time-of-flight depth trail and the triangulation factor;
   determining a sample having a minimum consistency error; and
   indicating a triangulated depth measurement for the sample having the minimum consistency error.

10. A depth imaging system, comprising:
    an optical source configured to output modulated structured light comprising a pattern of dots;
    an optical sensor comprising a 2D pixel grid;
    a controller configured with instructions to:
      illuminate an environment using the optical source;
      receive reflected illumination at the optical sensor;
      downsample received reflected illumination from the 2D pixel grid to a plurality of 1D dot trail vectors; and
      for each dot trail vector, indicate a depth based on a time-of-flight depth measurement and a triangulation factor.

11. The depth imaging system of claim 10, wherein downsampling received reflected illumination from the 2D pixel grid to the plurality of 1D dot trail vectors is based at least on a calibration between the optical source and the optical sensor.

12. The depth imaging system of claim 10, wherein downsampling received reflected illumination from the 2D pixel grid to the plurality of 1D dot trail vectors includes downsampling depth and filtered active brightness values generated based at least on received reflected illumination for each pixel of the 2D pixel grid.

13. The depth imaging system of claim 12, wherein the controller is further configured with instructions to:
    scan the 2D pixel grid along a scanning dimension;
    record each dot trail vector that intersects with the scanning dimension;
    interpolate values between pixels that are adjacent in the scanning dimension; and
    store values for filtered active brightness and depth in a dot trail table.

14. The depth imaging system of claim 12, where downsampling received reflected illumination from the 2D pixel grid to a plurality of 1D dot trail vectors comprises raster scanning the 2D pixel grid.

15. The depth imaging system of claim 10, wherein each 1D dot trail vector comprises a plurality of samples, each sample corresponding to a specific distance between a surface of the environment and the optical sensor.

16. The depth imaging system of claim 10, wherein the controller is further configured with instructions to:
for each sample along a 1D dot trail vector, determine a consistency error between an expected time-of-flight depth trail and the triangulation factor;
determine a sample having a minimum consistency error; and
indicate the time-of-flight depth measurement for the sample having the minimum consistency error.

17. The depth imaging system of claim 10, wherein indicating the depth is further based at least on filtered active brightness peak detection along the 1D dot trail vector.

18. The depth imaging system of claim 17, wherein the controller is further configured with instructions to:
detect peaks in filtered active brightness along the 1D dot trail vector;
for each peak, determine a consistency error between an expected time-of-flight depth trail and the triangulation factor;
determine a sample having a minimum consistency error; and
indicate a triangulated depth measurement for the sample having the minimum consistency error.

19. A method for operating a depth imaging system, comprising:
illuminating an environment using an optical source configured to output modulated structured light comprising a pattern of dots;
receiving reflected illumination at an optical sensor comprising a 2D pixel grid;
downsampling received reflected illumination from the 2D pixel grid to a plurality of 1D dot trail vectors;
determining an estimated depth for each 1D dot trail vector;
based on the estimated depth being below a threshold depth, indicating the depth is based at least on filtered active brightness peak detection along the 1D dot trail vector; and
based on the estimated depth being above the threshold depth, indicating a depth based on a time-of-flight depth measurement and a triangulation factor.

20. The method of claim 19, further comprising:
based on the estimated depth being below the threshold depth, detecting peaks in filtered active brightness along the 1D dot trail vector;
for each peak, determining a consistency error between the expected time-of-flight depth trail and the triangulation factor;
determining a sample having a minimum consistency error; and
indicating a triangulated depth measurement for the sample having the minimum consistency error; and
based on the estimated depth being above the threshold depth, for each sample along the 1D dot trail vector, determining the consistency error between the expected time-of-flight depth trail and the triangulation factor;
determining the sample having the minimum consistency error; and
indicating the time-of-flight depth measurement for the sample having the minimum consistency error.

* * * * *